United States Patent [19]

Thomas

[11] 3,950,108
[45] Apr. 13, 1976

[54] ADJUSTABLE BROOM BLOCK CLAMP

[75] Inventor: Paul P. Thomas, Bryan, Ohio

[73] Assignee: Winzeler Stamping Company, Montpelier, Ohio

[22] Filed: Oct. 23, 1974

[21] Appl. No.: 517,112

Related U.S. Application Data

[62] Division of Ser. No. 342,328, March 19, 1973, Pat. No. 3,858,266.

[52] U.S. Cl. .............................................. 403/192
[51] Int. Cl.² .......................................... B25G 3/24
[58] Field of Search ............. 15/106, 111, 114, 115, 15/117, 145 R, 146, 147 C, 148, 150, 151, 153, 177, 178, 229 BW, 229 AW; 403/189–193

[56] References Cited
UNITED STATES PATENTS

| 1,478,213 | 12/1923 | Forisdal ................................ 15/146 |
| 1,971,175 | 8/1934 | Diepold ................................ 15/169 |

FOREIGN PATENTS OR APPLICATIONS

| 21,102 | 3/1916 | Denmark ............................. 15/177 |
| 12,072 | 7/1896 | Switzerland ......................... 403/190 |
| 166,966 | 10/1950 | Austria ................................ 15/146 |

Primary Examiner—Daniel Blum
Attorney, Agent, or Firm—Reising, Ethington

[57] ABSTRACT

An adjustable clamp assembly for securing a broom block to a handle member including: an upper clamp member, a lower clamp member, and fastener members connecting the upper and lower clamp members. The upper clamp member includes a depending flange portion having an extension member and adjustment means for incrementally adjusting the vertical position of the extension member with respect to the depending flange portion wherein the adjustment means includes a plurality of apertures disposed in the depending portion and defining at least two spaced positions and tab members disposed on the extension member for selective mechanical interlocking engagement with the apertures in one of the positions.

1 Claim, 5 Drawing Figures

U.S. Patent   April 13, 1976   3,950,108
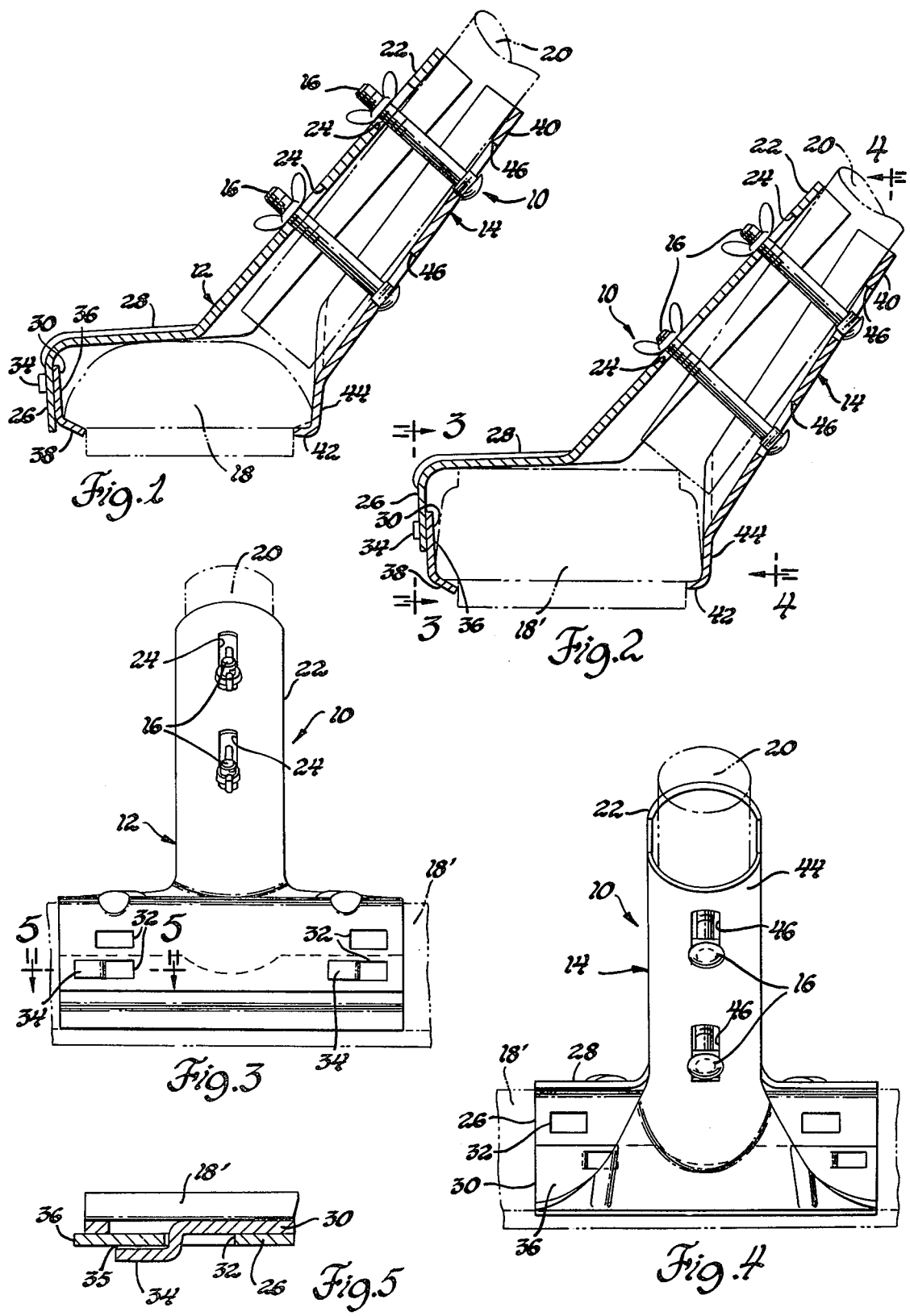

ND PAGE

ADJUSTABLE BROOM BLOCK CLAMP

This is a division of application Ser. No. 342,328, filed March 19, 1973, now U.S. Pat. No. 3,858,266, issued Jan. 7, 1975.

This invention relates to broom block clamp assemblies, that is, to a clamp assembly which is adapted to secure a broom block to the end of a broom handle. More specifically, the instant invention relates to a broom block clamp which is adjustable and therefore adapted to receive broom blocks of various sizes and shapes.

Many various constructions of broom block clamps or holders have been suggested as evidenced by the U.S. Pat. Nos. 1,917,747; 1,838,448; and 1,478.213. In terms of manufacturing broom block clamp assemblies, one of the primary problems which occurs is that there are many different sized broom blocks available on the market. Since it would be very uneconomical to produce a different clamp assembly for each size of broom block, it is desirable, and even necessary, to provide an adjustable clamp assembly; one which is easily adapted to receive a substantial majority of the broom blocks available, regardless of size differences. Heretofore, none of the broom block assemblies have proven completely satisfactory in terms of the economics of manufacture and ease of adjustability required.

In other words, those clamp assemblies which do have the desired feature of adjustability are of a construction which includes a large number of intricate parts which are difficult and relatively expensive to manufacture and assemble. These assemblies, therefore, do not represent an attractive, marketable product. An adjustable broom block clamp, to be commercially acceptable, must include a minimum number of easily formed parts while being capable of receiving all or a large majority of those broom blocks commonly available on the market.

It is therefore an object and feature of the instant invention to provide an adjustable clamp assembly for securing a broom block to a handle member which includes an upper clamp member, a lower clamp member, and fastener means connecting the upper and lower clamp members; the upper clamp member including a depending claim portion having an extension member and adjustment means for incrementally adjusting the position of the extension member with respect to the depending flange portion.

It is therefore an object and feature of the instant invention to provide an adjustable clamp assembly wherein the adjustment means cooperating between the extension member and the depending portion includes a plurality of apertures defining at least two spaced positions and tab members for selective mechanical interlocking engagement with the apertures in one of the positions.

It is another object and feature of the instant invention to provide an adjustable clamp assembly wherein the lower clamp member includes adjustment means for continuous longitudinal adjustments of the lower clamp member with respect to the handle member within predetermined limits.

It is therefore an object and feature of the instant invention to provide adjustment means on the lower clamp member including longitudinally elongated apertures through which the fastener members extend, the terminal ends of the apertures defining the limit of the longitudinal adjustment.

Other objects and features of the instant invention will be readily appreciated as the same becomes better understood by reference to the following detailed description when considered in connection with the accompanying drawing wherein:

FIG. 1 is a longitudinal cross-sectional view of a preferred embodiment of the instant invention;

FIG. 2 is a cross-sectional view of the instant invention similar to FIG. 1 but in an adjusted position;

FIG. 3 is a front elevational view of the instant invention in the adjusted position taken generally along line 3—3 of FIG. 2;

FIG. 4 is a rear elevational view of the instant invention taken generally along line 4—4 of FIG. 2; and FIG. 5 is an enlarged cross-sectional fragmented view taken generally along line 5—5 of FIG. 3.

Referring to the drawings, an adjustable clamp assembly for securing a broom block to a handle member is generally shown at 10. Generally, the clamp assembly 10 includes an upper clamp member generally indicated at 12 and a lower clamp member generally indicated at 14 which members are connected together by means of fastener members 16. The fastener members 16 include a bolt and wing nut. The bolt is preferrably a carriage-type bolt, that is, one which includes a square-ended shank to prevent rotation of the bolt while the wing nut is being tightened. The clamp assembly 10 is adapted for securing a broom block 18 to a handle member 20 wherein the broom block may be of various sizes.

The upper clamp member 12 includes a neck portion 22 which is arcuate in transverse cross-section for nesting the handle member 22 therein. The neck portion 22 includes a pair of fastener receiving elongated apertures 24 for receiving the fastener members 16. More specifically, each of the fastener members 16 includes an elongated bolt and wing nut wherein the threaded end of the bolt extends through the elongated apertures 24 in the neck portion 22 such that it may be threadedly engaged by the wing nut.

The upper clamp member 12 also includes a depending portion 26 which is connected to the neck portion 22 by means of a base portion 28. The depending portion 26 is provided with an extension member 30 and adjustment means for incrementally adjusting the position of the extension member 30 with respect to the depending portion 26.

The adjustment means cooperating between the extension member 30 and the depending portion 26 includes four rectangular apertures which are disposed in the depending portion 26 and are arranged in two columns to define two spaced positions. In other words, each aperature of each column is paired or mated with another aperture 32 in the other column which is laterally displaced therefrom to define at least two vertical positions as viewed in FIG. 3. The adjustment means also includes tab members 34 disposed on the extension member 30 for selective mechanical interlocking engagement with the apertures 32 in one of the positions defined.

The tab members 34 are laterally spaced one from the other at a distance which corresponds to the distance between the columns of apertures 32. The tab members 34 are struck out of a wall member 36 of the extension member 30 such that each tab member 34 defines a slot or opening 35 between the wall member 36 and the tab member 34. The extension member 30 may be removed from the lower pair of apertures 32 as viewed in FIG. 5 by moving the extension member 30 to the right until the tab members 34 are aligned with the apertures 32. The tab members 34 may then be moved through the apertures 32 thereby disengaging the extension member 30. The extension member 30 may then be moved to the upper pair of apertures 32 and engaged therewith by reversing the steps.

The extension member 30 further includes a lip member 38 disposed along the lower edge of the wall member 36 at an oblique angle therewith for engaging a portion of the broom block 18 as viewed in FIG. 1. Note that the extension member 30 is in the upper position, that is, the tab members 34 are disposed in the upper pair of apertures 32 to hold the broom block 18 against the underside of the base portion 28 as viewed in FIG. 1. If a broom block of a larger size is used, such as the broom block 18' as shown in FIG. 2, the extension member 30 is moved to the lower position. That is, the tab members 34 are disposed in the lower pair of apertures 32 thereby increasing the distance between the lip member 38 and the base portion 28 in order that the upper clamp portion 12 may receive the larger broom block 18'.

As best shown in FIG. 3, the sides of the extension member 30 are flush with the sides of the depending portion 26, that is, their horizontal dimensions are equal. It is noted, however, that the extension member 30 may be elongated laterally to engage a wider portion of the broom block 18. This feature provides greater stability to the clamp assembly 10 as can be easily recognized. The value of this feature can be most appreciated by considering the manufacturing process involved in making broom block clamps of this general configuration. That is, the upper and lower clamp members 12 and 14 are stamped from a sheet metal blank and, therefore, the greater the width of the depending portion 26, the greater will be the amount of scrap generated. The amount of scrap generated prohibits the use of a wide depending portion 26. The extension member 30, on the other hand, can be made to any length desired without generating any scrap or waste material.

The lower clamp member 14 includes a neck portion 40, arcuate in transverse cross-section, which is complimentary with the neck portion 22 of the upper clamp member 12 for nesting the handle member 22 therebetween. The lower clamp member 14 also includes a lip member 42 for engaging a portion of the broom block 18 or 18' and a connecting portion 44 for connecting the neck portion 40 to the lip member 42. The lip member 42 may also be elongated for the same purpose as hereinbefore described in regard to the extension member 30. This may be accomplished by welding extension arms to the sides of the lip member 42 to increase its width or by using the same connection provided for the extension member 30 on the upper clamp member 12.

The lower clamp member 14 also includes adjustment means, however, the adjustment means permits continuous longitudinal adjustment of the lower clamp member 14 with respect to the handle member 20 within predetermined limits, as distinguished from the incremental adjustment of the upper clamp member 12. The adjustment means for the lower clamp member 14 includes a pair of longitudinally elongated apertures 46 through which the fastener members 16 extend. The longitudinal position of the lower clamp member 14 may, therefore, be positioned anywhere within the limits defined by the ends of the elongated apertures 46.

When a broom block is selected the position of the extension member 30 is determined by the thickness or height of the broom block. That is, if the broom block is relatively narrow such as the broom block 18 the extension member is placed in the upper position; however, if the broom block is relatively thick, as is the broom block 18', the extension member 30 is disposed in the lower position. The broom block is thereafter disposed between the upper and lower clamp members 12 and 14 and the fastener members 16 are disposed therebetween and extend through holes in the handle member 20. Before the wing nuts are tightened down, the lower clamp member 14 is adjusted by sliding it longitudinally along the length of the handle member in the elongated apertures 46 until the broom block is moved to a position wherein it wedges against the underside of the base portion 28 as shown in FIG. 1 or contacts the end of the broom handle 20 and base portion 28 as shown in FIG. 2. To insure that one of these conditions are met, that is, that the broom block be engaged by the base portion 28 or the handle member 20, the upper clamp member 12 should also be longitudinally adjustable. For this reason, the fastener receiving aperatures 24 in the upper clamp member 12 are also elongated. The elongated fastener receiving aperatures 24 become critical only when the broom block is of a particularly odd-sized configuration, that is, very small or very large. The elongated fastener receiving aperatures 24, therefore, extend the range of adaptable broom block sizes and insure a stable connection between the broom block and clamp assembly. After the upper and lower clamp members are properly adjusted, the wing nuts are tightened down until the neck portions 22 and 40 firmly clamp around the handle member 20 and the lip members 38 and 42 firmly grip the broom block 18 or 18'.

The broom block clamp assembly 10 of the instant invention, therefore, teaches an adjustable clamp assembly having relatively few parts of simple construction which cooperate to receive and firmly hold a variety of different sized broom blocks.

The invention has been described in an illustrative manner, and it is to be understood that the terminology which has been used is intended to be in the nature of words of description rather than of limitation.

Obviously, many modifications and variations in the instant invention are possible in light of the above teachings. It is, therefore, to be understood that the invention may be practiced otherwise than as specifically described and yet remain within the scope of the depending claims.

The embodiments of the invention in which an exclusive property or privilege is claimed are defined as follows:

1. A combined handle and an adjustable clamp assembly for securing a broom block to the handle comprising an elongated handle member having first and second substantially aligned, longitudinally spaced holes therethrough;

an upper clamp member including first and second elongated substantially aligned, longitudinally extending, upper clamp member apertures for use in securing said upper clamp member to said handle member;

a lower clamp member including first and second elongated substantially aligned, longitudinally extending, lower clamp member apertures for use in securing said lower clamp member to said handle member, and first and second fastener members extending respectively through said first and second elongated upper clamp member apertures, said first and second holes in said handle, and said first and second elongated lower clamp member apertures to interconnect and secure together said upper clamp member, said handle member, and said lower clamp member; said upper and lower clamp members adapted to engage and retain a said broom block and said first and second fastener members being positioned in said elongated apertures such that said handle may be in engagement with a said broom block.

* * * * *